United States Patent
Planas Valls

(10) Patent No.: US 7,081,200 B2
(45) Date of Patent: Jul. 25, 2006

(54) SWIMMING POOL FILTER

(75) Inventor: Carles Planas Valls, Cardedev (ES)

(73) Assignee: Sacopa, S.A.U., Sant Jaume de Llierca (Girona) (ES)

( * ) Notice: Subject to any disclaimer, the term of this patent is extended or adjusted under 35 U.S.C. 154(b) by 317 days.

(21) Appl. No.: 10/625,035

(22) Filed: Jul. 22, 2003

(65) Prior Publication Data

US 2004/0118763 A1 Jun. 24, 2004

(30) Foreign Application Priority Data

Jul. 25, 2002 (ES) .............................. 200201897 U
Jul. 26, 2002 (ES) .............................. 200201913 U

(51) Int. Cl.
*B01D 35/26* (2006.01)
*B01D 24/48* (2006.01)

(52) U.S. Cl. .................. 210/232; 210/169; 210/416.2; 210/289; 210/264; 210/278

(58) Field of Classification Search ................ 210/232, 210/169, 416.2, 289, 264, 278
See application file for complete search history.

(56) References Cited

U.S. PATENT DOCUMENTS 3,012,676 A * 12/1961 Englesberg .................. 210/94
3,420,376 A * 1/1969 Smith .......................... 210/95
3,493,116 A * 2/1970 Edmiston ..................... 210/266
3,513,981 A * 5/1970 Mendelow ................... 210/411
3,767,050 A * 10/1973 Reiner ......................... 210/169
3,828,932 A * 8/1974 Schneer ....................... 210/169
4,240,174 A * 12/1980 Thiem et al. .................. 15/1.7
4,581,075 A * 4/1986 St. Martin ................... 134/18
4,652,369 A * 3/1987 DePolo et al. .............. 210/169
4,867,413 A * 9/1989 Tessler ........................ 251/304
5,762,785 A * 6/1998 Garrigos Ruiz ............. 210/169
6,173,743 B1 * 1/2001 Ibanez Sapina ........ 137/625.46

* cited by examiner

*Primary Examiner*—Thomas M. Lithgow
(74) *Attorney, Agent, or Firm*—Wolf Block Schorr & Solis-Cohen LLP

(57) ABSTRACT

The invention relates to a swimming pool filter that includes a filter body (1) being formed by a casing (2) with a top cover (3), and the cover (3) forms a water distributor (4), this latter being compartmented (6, 7, 8, 9 and 10), upperly open (11) and provided with lateral openings (12, 13, 14 and 15) for a selected water inflow and outflow, the distributor (4) being closed by a rotatable (24), compartmented (20, 21, 22 and 32) sealing subcover (19). The subcover (19) is apt to be stabilized in its different positions by means of peripheral projections (27) being apt to selectively fit into a socket (28) being integral with the cover (3) in the vicinity of its open top (11). A receiver (32) is inferiorly fitted to the casing (2) and is made up of a grid-like plate conforming to the periphery of the casing (2).

6 Claims, 3 Drawing Sheets

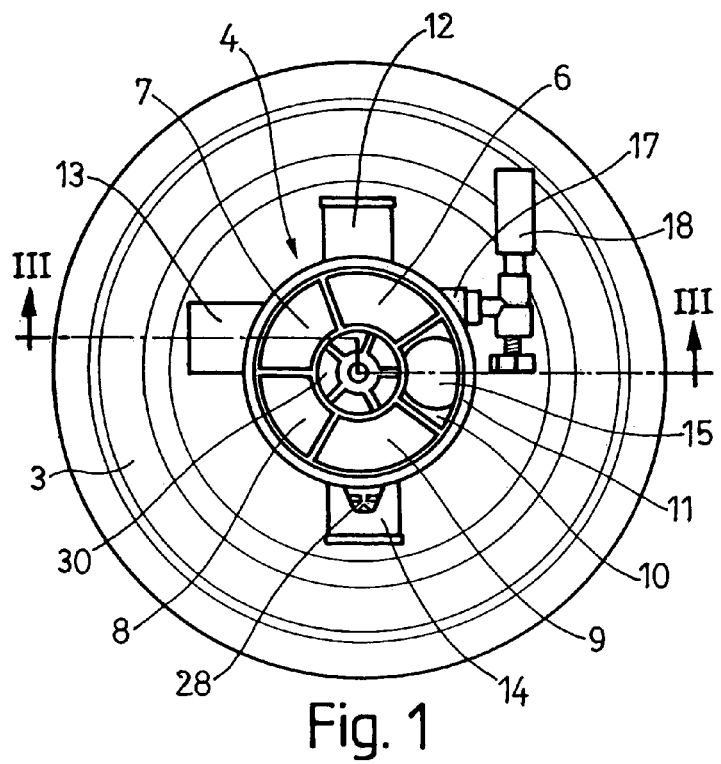
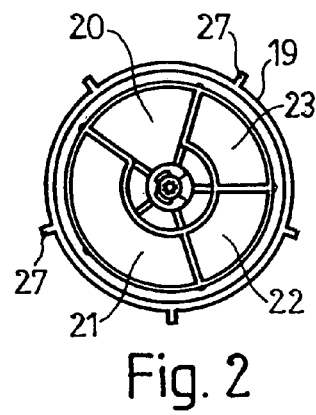
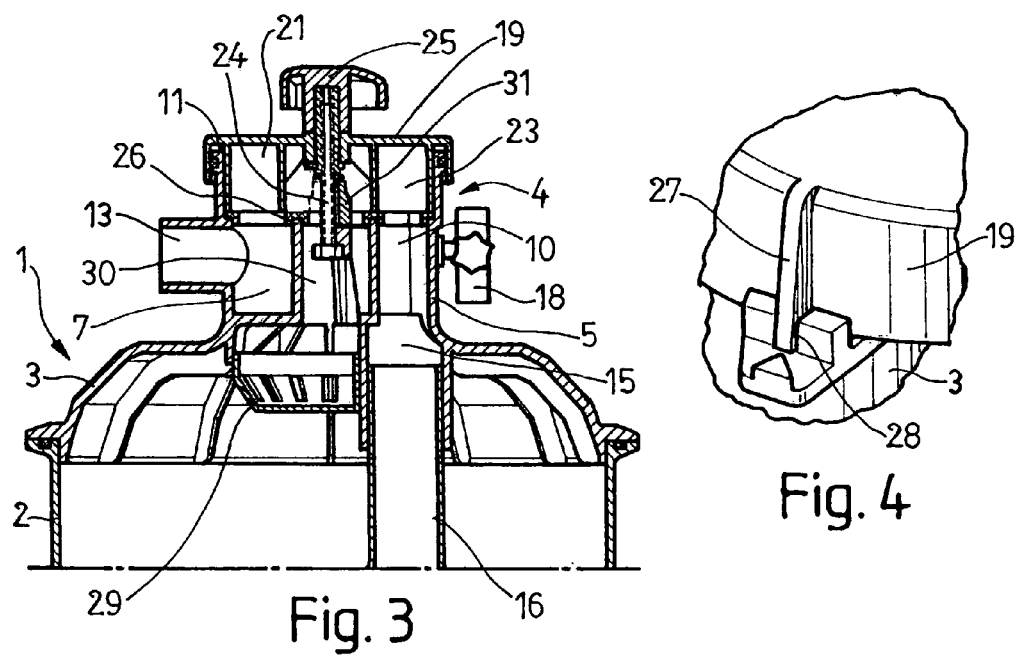
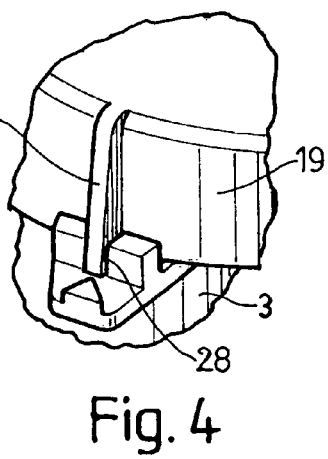

SWIMMING POOL FILTER

FIELD OF THE INVENTION

This invention refers to a swimming pool filter.

BACKGROUND OF THE INVENTION

For the cleaning of the swimming pool water several types of filters are already known which comprise a filter body being generally formed by a casing having water inlet and outlet connections and being completed with a top cover and a footing or bearing feet, said casing receiving a sand filling or a filtering cartridge, said footing being equipped with a motor-driven pump.

A water distributor is fitted to the water inlet and outlet connections of the casing, said distributor being a separate member being removably fixed to the side or to the upper portion of the filter body, and in the filters using sand as a filtering mass a receiver is installed at the bottom of the casing and is generally made up of radial elements being provided with perforations.

SUMMARY OF THE INVENTION

It is the object of this invention to provide a filter integrally comprising the water distributor thus simplifying the manufacture and installation of the filter assembly while at the same time reducing its cost.

This type of filter is for such a purpose characterized in that the very top cover of the casing forms the water distributor, this latter being compartmented, upperly open, provided with lateral openings for a selected water inflow and outflow, and closed by a rotatable, compartmented sealing subcover.

This subcover is apt to be stabilized in its different positions by means of peripheral projections being apt to selectively fit into a socket being integral with the cover in the vicinity of its open top.

This filter has a simplified makeup, occupies little space, and improves the water filtration.

In order to better receive the filtered water being submitted to the filtering action of the whole mass of filtering sand this filter is characterized in that the receiver is made up as a grid-like plate conforming to the periphery of the filter body casing.

This filter comprises a casing with handles facilitating its transportation, said casing being closed with the top cover bearing the water distributor; and a separate footing being formed by a housing with a bottom cap and a side opening through which the motor-driven pump projects.

The water distributor, the cover, the casing and the footing are in a vertically aligned relationship with each other thus occupying a minimum space.

This filter comprises an outer hose connecting the motor-driven pump to the water distributor, and the cover is secured to the casing by means of a clamp.

These and other characteristics will be best made apparent by the following detailed description whose understanding will be made easier by the accompanying three sheets of drawings showing a practical embodiment being cited only by way of example and hence not limiting the scope of the present invention.

BRIEF DESCRIPTION OF THE DRAWINGS

In the drawings:

FIG. 1 in a plan-view illustrates the casing cover;

FIG. 2 shows the subcover in a plan-view from below;

FIG. 3 is a sectional elevation of the upper portion of the filter body;

FIG. 4 is a detail and perspective view of the means being used to stabilize the positions of the subcover;

DETAILED DESCRIPTION OF THE INVENTION

Figure 5:
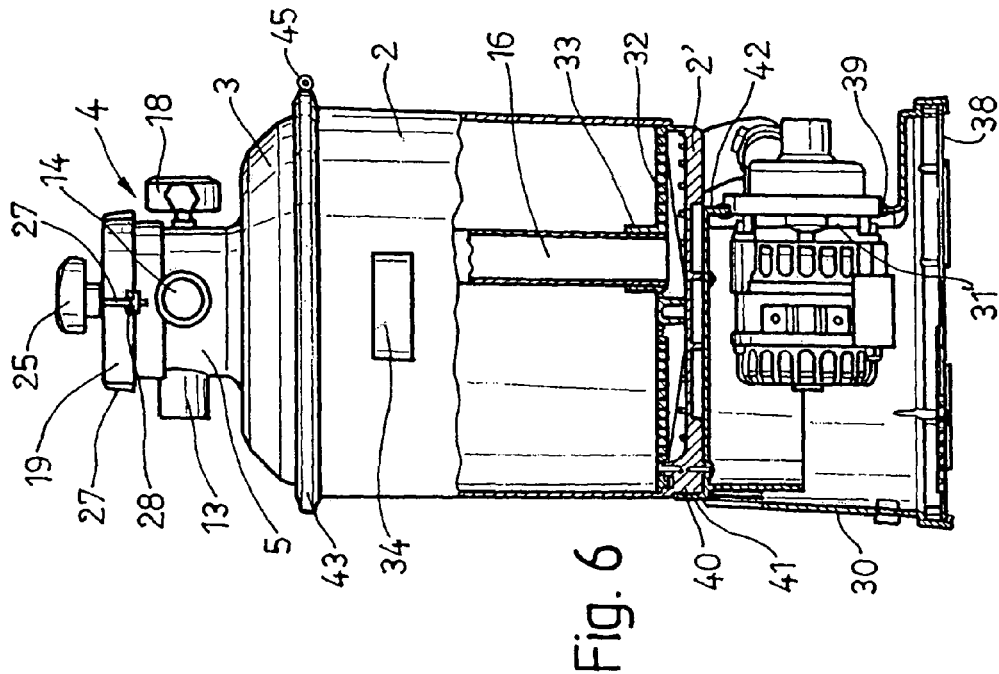
FIG. 5 shows in a side elevation the filter assembly.

According to the drawings this swimming pool filter comprises a filter body (1) being formed by a casing (2) with a top cover (3) being a one-piece member forming the water distributor (4) and having a neck (5) with five compartments (6), (7), (8), (9) and (10), said neck being upperly open thus forming the open top (11), compartment (6) coinciding with the water inlet opening (12), compartment (7) coinciding with the water outlet opening (13), compartment (8) being blind, compartment (9) coinciding with the water outlet opening (14), and compartment (10) coinciding with the lower opening (15) to which tube (16) is fitted, said tube being inferiorly fitted to the bottom of casing (2). A conduit (17) derives laterally from the compartment (6) and has a manometer (18) connected to it.

The distributor (4) is closed with a subcover (19) being provided with compartments (20), (21), (22) and (23) and rotatably mounted by means of the central screw-pin (24) to thus be actuated by means of a knob (25).

In its lowered position this subcover (19) rests on a seal (26) being fitted onto the upper edges of the small partitions determining the compartments of the distributor (4), said seal thus sealingly isolating said compartments from each other.

The positions of the subcover (19) are stabilized by selectively fitting the peripheral projections (27) (FIG. 4) into a socket (28) being integral with the cover (3) in the vicinity of its open top (11).

A diffuser (29) is inferiorly fitted to the cover (3) and is apt to diffuse the water flowing in from the central passage (30) of the cover towards the casing (2) comprising the filtering sand.

A pad member (31) is fitted around the screw-pin (24) and serves to prevent an excessive tightening of the subcover (19) thus preserving this latter's integrity.

The filter comprises a footing (30') being equipped with a motor-driven pump (31').

Figure 6:
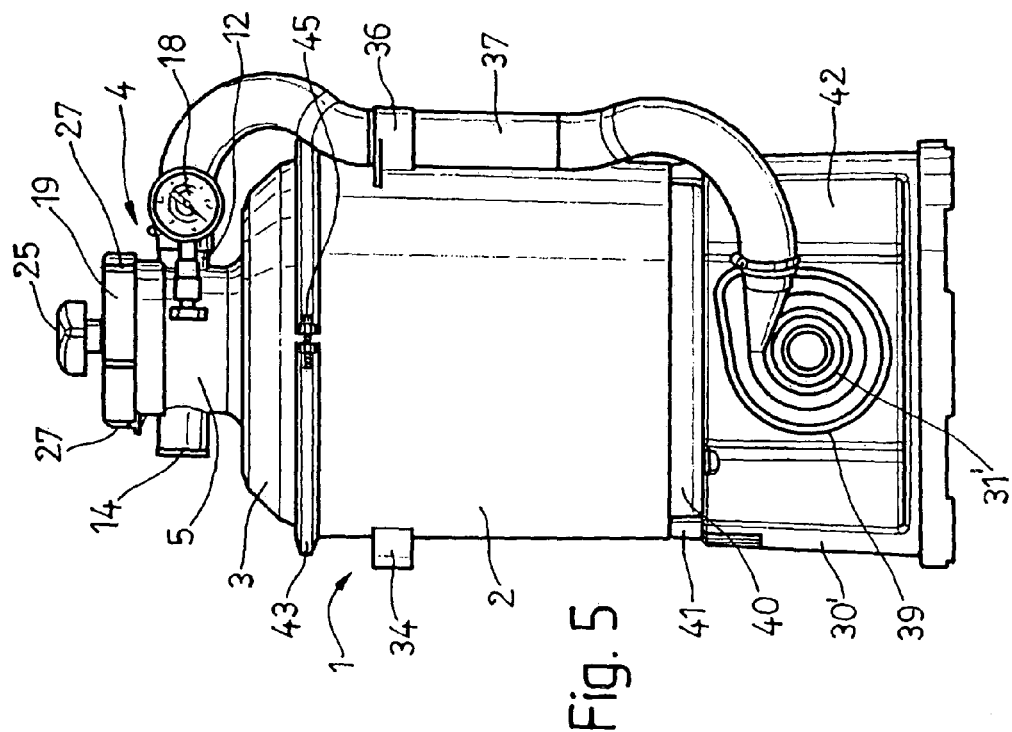
FIG. 6 illustrates the filter as seen in an elevational view after having been turned by 90° with respect to FIG. 5, the filter having been in this view partially broken away so as to show its sectioned lower half.
Figure 8:
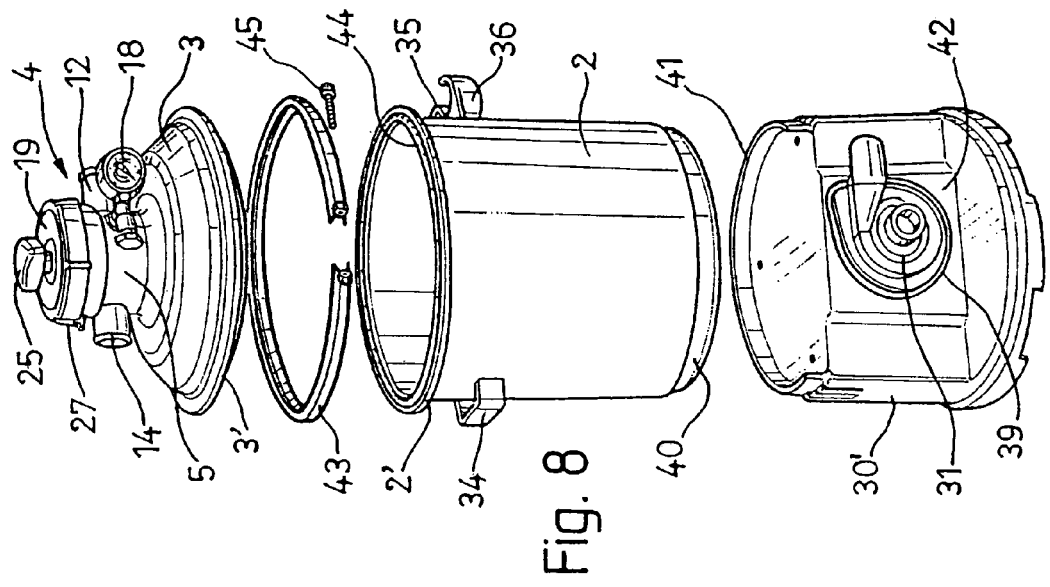
FIG. 8 shows in a perspective and exploded view the footing, the casing and its cover and the clamp.
Figure 7:
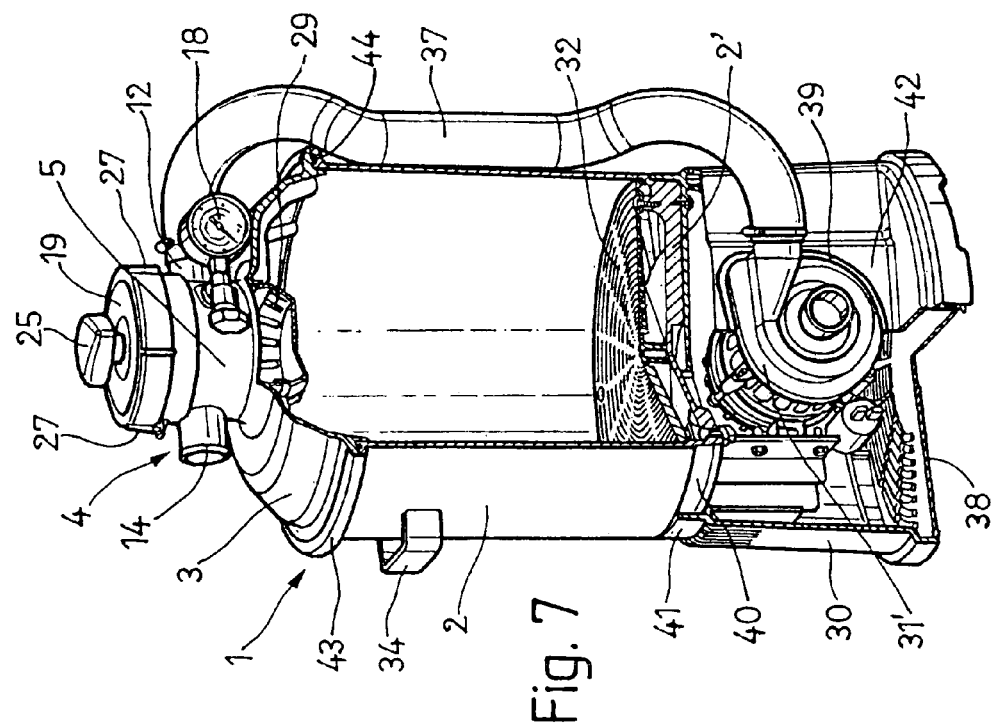
FIG. 7 represents in a perspective view this filter having been partially broken away so as to show its inside.

A receiver (32) (FIG. 6) is fitted onto the bottom (2') of the casing (2) and is made up of a circular grid-like plate at its periphery conforming to the inner wall of the cylindrical casing (2), said plate comprising a circular opening forming a collar (33) to which the tube (16) is inferiorly fitted.

The casing (2) has two opposite handles (34) and (35), this latter forming a hook (36) being apt to receive an outer hose (37) connecting the motor-driven pump (31') to the opening (12) of the water distributor (4).

The footing (30') is formed by an open-bottomed housing being closed with a cap (38) and having a side opening (39) through which the motor-driven pump (31') projects.

The casing (2) is fixed onto the footing (30') by fitting a peripherally recessed step (40) of its bottom into a rim (41) of the upper contour of the footing (30'), this latter laterally having a recessed portion (42) through which the motor-driven pump (31') projects.

The cover (3) is secured to the casing (2) by means of a clamp (43) surrounding the open bottom and the open top of said members, respectively, said open bottom and open top each respectively having a peripheral flange (3') and (2'), this latter being fitted with a seal (44), said clamp being closed by means of a bolt (45).

This makeup of the filter components and the vertically aligned relationship between the cover (3) with the distributor (4), the casing (2) and the footing (30') determine a compact assembly needing little space for its installation.

The invention can within its essentiality be put into practice in other embodiments only in detail differing from the one having been described above only by way of example, said other embodiments also falling within the scope of the protection being sought.

The invention claimed is:

1. A swimming pool filter comprising a filter body being formed by a casing with a top cover and a footing equipped with a motor-driven pump; wherein said cover forms a water distributor, this latter having compartments, an open top, and lateral openings for a selected water inflow and outflow, said distributor being closed by a rotatable, compartmented sealing subcover.

2. A swimming pool filter as per claim 1, wherein the subcover stabilized in its different positions by means of a plurality of peripheral projections structured and arranged to selectively fit into a socket which is integral with the cover in the vicinity of its open top.

3. A swimming pool filter as per claim 1, wherein a receiver is inferiorly fitted to the casing and is made up of a grid-like plate conforming to the periphery of said casing.

4. A swimming pool filter as per claim 3, wherein the cover comprises the water distributor, the casing has handles, and the footing forms a housing being provided with a bottom cap and having a side opening through which the motor-driven pump projects, the liquid distributor, the cover, the casing and the footing being in a vertically aligned relationship with each other.

5. A swimming pool filter as per claim 3, wherein the motor-driven pump is connected to the water distributor by means of an outer hose.

6. A swimming pool filter as per claim 3, wherein the cover is secured to the casing by means of a clamp.

* * * * *